United States Patent
Darling et al.

(10) Patent No.: US 11,723,390 B2
(45) Date of Patent: Aug. 15, 2023

(54) HIGH PROTEIN FOOD

(71) Applicant: General Mills, Inc., Minneapolis, MN (US)

(72) Inventors: Colby Darling, Minneapolis, MN (US); Catherine Davlin, Minneapolis, MN (US); Sara Rosene, New Hope, MN (US); Natasha Weatherby, Minneapolis, MN (US)

(73) Assignee: General Mills, Inc., Minneapolis, MN (US)

(*) Notice: Subject to any disclaimer, the term of this patent is extended or adjusted under 35 U.S.C. 154(b) by 0 days.

(21) Appl. No.: 17/168,363

(22) Filed: Feb. 5, 2021

(65) Prior Publication Data

US 2021/0244055 A1    Aug. 12, 2021

Related U.S. Application Data

(60) Provisional application No. 62/971,634, filed on Feb. 7, 2020.

(51) Int. Cl.
*A23L 25/10* (2016.01)
*A23L 33/105* (2016.01)
*A23L 33/125* (2016.01)
*A23L 29/30* (2016.01)
*A23D 9/007* (2006.01)
*A23J 3/08* (2006.01)
*A23J 3/16* (2006.01)

(52) U.S. Cl.
CPC .............. *A23L 25/10* (2016.08); *A23D 9/007* (2013.01); *A23J 3/08* (2013.01); *A23J 3/16* (2013.01); *A23L 29/37* (2016.08); *A23L 33/105* (2016.08); *A23L 33/125* (2016.08)

(58) Field of Classification Search
None
See application file for complete search history.

(56) References Cited

U.S. PATENT DOCUMENTS

| | | | |
|---|---|---|---|
| 3,580,729 A | 5/1971 | Darragh et al. | |
| 3,882,254 A * | 5/1975 | Gooding | A23L 25/10 426/633 |
| 5,433,970 A | 7/1995 | Wong et al. | |

(Continued)

FOREIGN PATENT DOCUMENTS

| | | |
|---|---|---|
| CA | 2401114 | 10/2001 |
| CA | 2877120 | 12/2013 |

(Continued)

OTHER PUBLICATIONS

Dayrit: The Properties of Lauric Acid and Their Significance in Coconut Oil; Journal of the American Oil Chemists' Society vol. 92, pp. 1-15 (2015) (Year: 2015).*

Jeyarani: Trans-free plastic shortenings from coconut stearin and palm stearin blends; Food Chemistry, vol. 114, Issue 1, May 1, 2009, pp. 270-275. (Year: 2009).*

(Continued)

*Primary Examiner* — Patricia A George
(74) *Attorney, Agent, or Firm* — Diederiks & Whitelaw, PLC; Rachel A. Kahler

(57) ABSTRACT

Described herein is a food that is suitable for use as a shelf stable nut butter based spread. The food has a protein content of at least 25% by weight, and a nut butter content of at least 50% by weight. The food retains a desirable eating experience, similar to a natural nut butter spread or a stabilized nut butter spread despite having a high protein content.

18 Claims, 9 Drawing Sheets

(56) References Cited

U.S. PATENT DOCUMENTS

| | | | |
|---|---|---|---|
| 5,490,999 | A | 2/1996 | Villagran et al. |
| 5,508,057 | A | 4/1996 | Wong et al. |
| 5,518,755 | A | 5/1996 | Wong et al. |
| 6,706,311 | B2 | 3/2004 | Wong et al. |
| 9,005,685 | B2 | 4/2015 | Cotton et al. |
| 2002/0037355 | A1 | 3/2002 | Wong et al. |
| 2004/0208962 | A1 | 10/2004 | Eberhart et al. |
| 2005/0142276 | A1* | 6/2005 | Slesinski ............... A23L 25/10 426/633 |
| 2006/0051474 | A1 | 3/2006 | Furlong et al. |
| 2016/0021916 | A1 | 1/2016 | Deo et al. |
| 2016/0316778 | A1 | 11/2016 | Nagy et al. |

FOREIGN PATENT DOCUMENTS

| | | |
|---|---|---|
| CN | 103919193 | 7/2014 |
| GB | 2007961 | 5/1979 |
| JP | 3085962 | 9/2000 |
| WO | WO 1992/020243 | 11/1992 |
| WO | WO 2001/072146 | 10/2001 |
| WO | WO 2018/236365 | 12/2018 |
| WO | WO 2019/063824 | 4/2019 |

OTHER PUBLICATIONS

Berk: FAO Agricultural Services Bulletin No. 97; Food and Agriculture Organization of the United Nations Rome 1992. (Year: 1992).*

Ehrenhauser: Size matters: Crystal size analysis for the Louisiana sugar industry; published online at least by Apr. 14, 2018 at: https://web.archive.org/web/20180414093537/https://www.lsuagcenter.com/profiles/lbenedict/articles/page14913249 16020 (Year: 2018).*

Gonze: EPO publication No. 0497439 A1, publication date: Aug. 5, 1992. (Year: 1992).*

Shakerardekani: Textural, Rheological and Sensory Properties and Oxidative Stability of Nut Spreads—A Review; Int. J. Mol. Sci. 2013, 14, 4223-4241; doi:10.3390/ijms14024223. (Year: 2013).*

Kaar: Development and analysis of multi-nut spread for children aged between 7-9 years; International Journal of Food Science and Nutrition ISSN: 2455-4898 Impact Factor: RJIF 5.14 www.foodsciencejournal.com vol. 3; Issue 2; Mar. 2018; p. 44-48. (Year: 2018).*

Yeh et al., "*Optimizing Protein- and Vitamin-Fortified Peanut Spreads Containing Soybean or Milk Powder*", Journal of Food Quality, vol. 26, No. 3, pp. 243-256, 2003.

Shakeradekani et al., "*Textural, Rheological and Sensory Properties and Oxidative Stability of Nut Spreads—A Review*", Int. Journal of Molecular Sciences, No. 14, pp. 4223-4241, 2013.

\* cited by examiner

HIGH PROTEIN FOOD

CROSS REFERENCE TO RELATED APPLICATIONS

This application claims the benefit of U.S. Provisional Patent Application Ser. No. 62/971,634, which was filed on Feb. 7, 2020 and titled "High Protein Food". The entire content of this application is incorporated by reference.

BACKGROUND

Consumers are increasingly looking for foods that meet their nutritional needs without requiring preparation. Ready-to-eat protein products meet a need for consumers. Ready-to-eat protein products are particularly challenging because high protein content can contribute a number of undesired texture and flavor attributes to a food.

Nut butter spreads, such as natural nut butters and stabilized nut butters, are foods with a relatively high protein content that many consumers enjoy due to their flavor and convenience as a food. Consumers particularly enjoy texture attributes, including creaminess and mouth coating, that are characteristic of nut butters. Consumers also enjoy other nut butter-based foods that share similar flavor to nut butter spreads. However, as additional ingredients are combined with nut butter to achieve properties suitable for nut butter-based foods other than nut butter spreads, it is particularly difficult to retain the texture attributes characteristic of nut butters that consumers enjoy.

SUMMARY

The present disclosure relates to a high protein food article that has a desirable texture and an extended shelf life.

A food is provided herein. In some embodiments, a food includes nut butter in an amount of at least 50% by weight of the food; at least 25% protein by weight of the food, the protein including a powdered protein ingredient contributing at least 12% protein by weight of the food; a stabilizing fat in an amount of about 14% to about 22% by weight of the food, the stabilizing fat contributing lauric acid in an amount of about 3% to about 10% by weight of the food; a powdered food ingredient in an amount of about 8% to about 25% by weight of the food; a shelf stability of at least 60 days; a structure that facilitates spreadability; and a texture that exhibits a decrease in shear resistance at 37° C. relative to 21° C.

In some embodiments, a powdered food ingredient can include erythritol in an amount of about 5% to about 15% by weight of the food.

In some embodiments, a stabilizing fat can have a Mettler Dropping Point of from about 32° C. to about 48° C., and a 10° C. to 40° C. solid fat content ($SFC_{10-40}$) profile, the $SFC_{10-40}$ profile having a formula of y=mx+b, where
  y is solid fat content,
  x is temperature in Celsius,
  m is slope having a value between about −1.5 and about −3.5, and
  b is a y-intercept having a value between about 60° C. and about 120° C.

In some embodiments, a stabilizing fat can have a $SFC_{10-40}$ profile with a formula of y=mx+b, where
  y is solid fat content,
  x is temperature in Celsius,
  m is slope having a value between about −1.5 and about −3, and
  b is a y-intercept having a value between about 60° C. and about 100° C.

In some embodiments, a stabilizing fat can have a 26.7° C. to 40° C. solid fat content ($SFC_{27-40}$) profile, the $SFC_{27-40}$ profile having a formula of y=mx+b, where
  y is solid fat content,
  x is temperature in Celsius,
  m is slope having a value between about −0.01 and about −2, and
  b is a y-intercept having a value between about 5° C. and about 60° C.

In some embodiments, a stabilizing fat can have a $SFC_{27-40}$ profile with a formula of y=mx+b, where
  y is solid fat content,
  x is temperature in Celsius,
  m is slope having a value between about −0.01 and about −1.5, and
  b is a y-intercept having a value between about 5° C. and about 30° C.

In some embodiments, a stabilizing fat can have a 10° C. to 26.7° C. solid fat content ($SFC_{10-27}$) profile, the $SFC_{10-27}$ profile having a formula of y=mx+b, where
  y is solid fat content,
  x is temperature in Celsius,
  m is slope having a value between about −2.5 and about −6, and
  b is a y-intercept having a value between about 80° C. and about 135° C.

In some embodiments, a stabilizing fat can have a $SFC_{10-27}$ profile with a formula of y=mx+b, where
  y is solid fat content,
  x is temperature in Celsius,
  m is slope having a value between about −3 and about −5, and
  b is a y-intercept having a value between about 105° C. and about 130° C.

In some embodiments, a food provided herein can have a rheology inflection midpoint at 21° C. ($RIM_{21}$) and a rheology inflection midpoint at 37° C. ($RIM_{37}$), where the $RIM_{37}$ is at least $1\times10^1$ Pa greater than the $RIM_{21}$.

In some embodiments, a food provided herein can include at least 25% protein by weight of the food, the protein including a powdered protein ingredient contributing at least 12% protein by weight of the food; a nut butter in an amount of at least 50% by weight of the food; a stabilizing fat in an amount of about 14% to about 22% by weight of the food, the stabilizing fat having a Mettler Dropping Point of from about 32° C. to about 48° C., and a 10° C. to 40° C. solid fat content ($SFC_{10-40}$) profile, the $SFC_{10-40}$ profile having a formula of y=mx+b, where
  y is solid fat content,
  x is temperature in Celsius,
  m is slope having a value between about −1.5 and about −3.5, and
  b is a y-intercept having a value between about 60° C. and about 120° C.; and
  a powdered food ingredient in an amount of about 8% to about 25% by weight of the food.

In some embodiments, a stabilizing fat can include a coconut oil, a palm kernel oil, a palm kernel oil stearin, or a coconut oil stearin. In some embodiments, a stabilizing fat can include a palm stearin and a coconut oil.

In some embodiments, a food can include nut butter in an amount of from 50% to about 65% by weight of the food.

In some embodiments, a nut butter can include peanut butter, almond butter, or cashew butter.

In some embodiments, a powdered protein ingredient can include whey protein and soy protein, the whey protein and soy protein included at a ratio of from about 30:70 to about 70:30. In some embodiments, a powdered protein ingredient can include whey protein isolate in an amount of from about 5% to about 15% by weight of the food and soy protein isolate in an amount of from about 5% to about 15% by weight of the food. In some embodiments, a powdered protein ingredient and a powdered food ingredient can each include particles, where at least 80% of the particles have a particle size of less than 40 microns.

In some embodiment, a food provided herein can consist essentially of a nut butter in an amount of from 50% to 65% by weight of the food; powdered protein ingredient in an amount of sufficient to contribute at least 12% protein by weight of the food, the food having a protein content of at least 25% by weight of the food; stabilizing fat in an amount of 14% to 22% by weight of the food, the stabilizing fat contributing lauric acid in an amount of about 3% to about 10% by weight of the food; erythritol in an amount of from 6% to 12% by weight of the food; and flavorants in an amount of up to 8% by weight of the food.

In some embodiments a powdered protein ingredient can consist of whey protein, soy protein, egg white protein, or a combination thereof. In some embodiments, a powdered protein ingredient can consist of whey protein and soy protein in a ratio of from 30:70 to 70:30. In some embodiments, a powdered protein ingredient and a powdered food ingredient can each include particles, where at least 80% of the particles have a particle size of less than 40 microns.

In some embodiments, a stabilizing fat can comprise coconut oil, palm kernel oil, palm kernel oil stearin, coconut oil stearin, or a combination thereof.

In some embodiments, a stabilizing fat can have a Mettler Dropping Point of from about 32° C. to about 45° C.; a 10° C. to 40° C. solid fat content ($SFC_{10-40}$) profile, the $SFC_{10-40}$ profile having a formula of y=mx+b, where y is solid fat content, x is temperature in Celsius, m is slope having a value between about −1.5 and about −3, and b is a y-intercept having a value between about 60° C. and about 100° C.; and a $SFC_{27-40}$ profile with a formula of y=mx+b, where y is solid fat content, x is temperature in Celsius, m is slope having a value between about −0.01 and about −1.5, and b is a y-intercept having a value between about 5° C. and about 30° C.

These and various other features and advantages will be apparent from a reading of the following detailed description.

DETAILED DESCRIPTION

Figure 1:
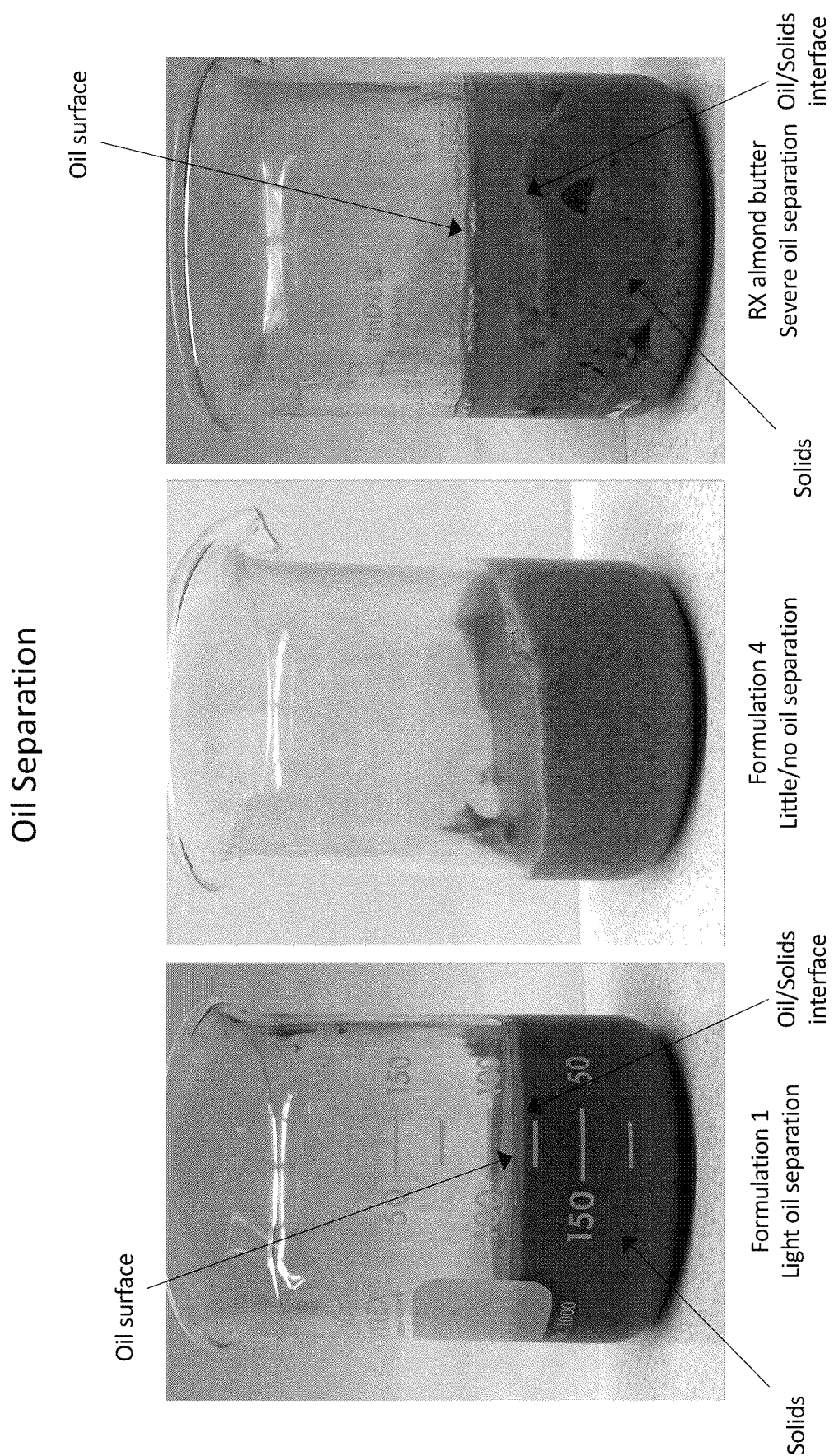
FIG. 1 shows oil separation of two embodiments of a food provided herein (Formulation 1 and Formulation 4, from Table 1) as compared to a commercially available nut butter spread (RX almond butter). Each sample was removed from the original container, taking care to maintain the relative levels of solids and oil, without mixing, and placed in a beaker for viewing oil separation.
Figure 2:
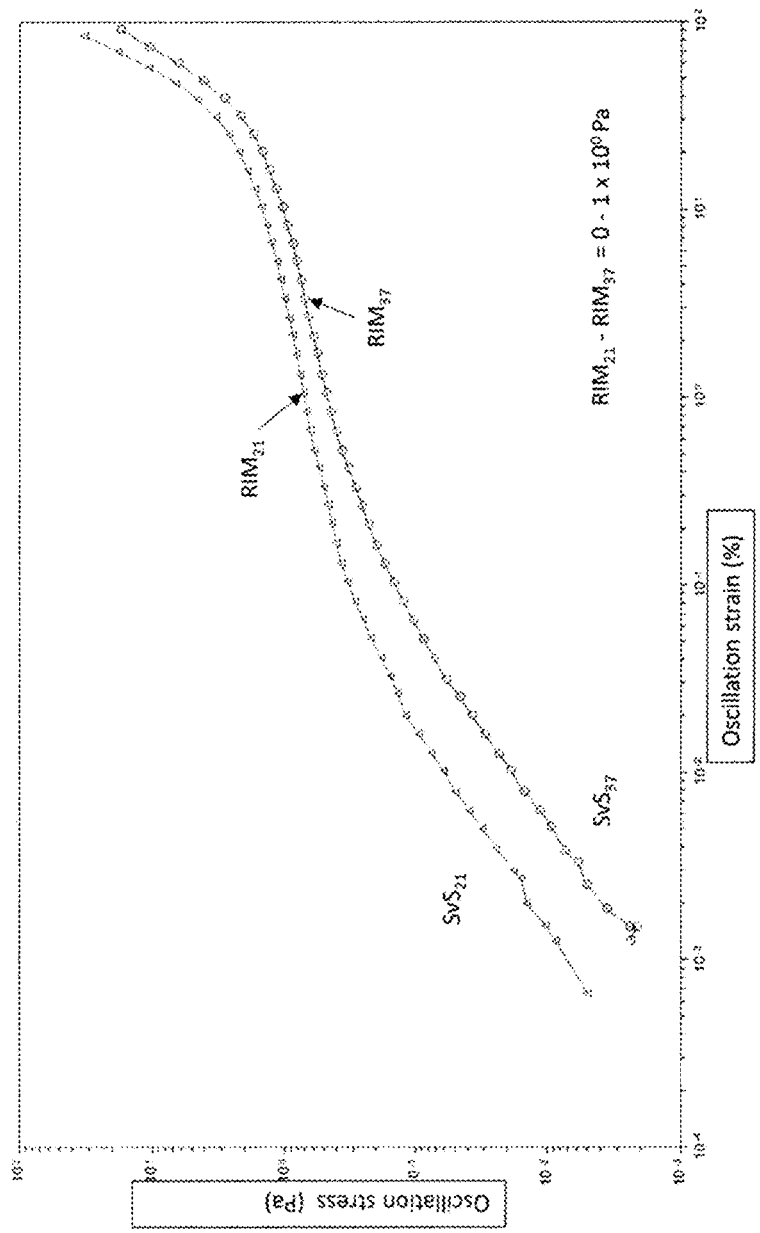
FIG. 2 shows a rheology profile of a food provided herein. The rheology profile exhibits a $RIM_{21}$ that less than $1 \times 10^1$ Pa greater than the $RIM_{37}$. The food has a pleasant texture reminiscent of a natural nut butter spread.
Figure 3:
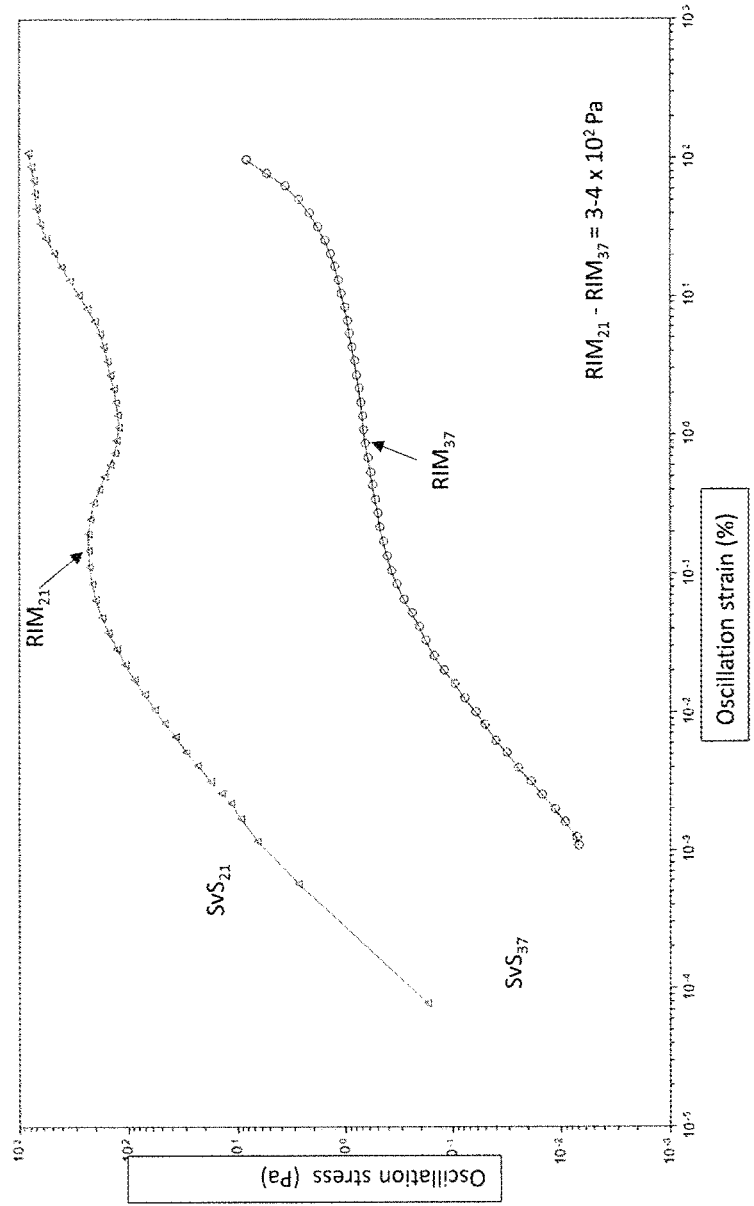
FIG. 3 shows a rheology profile of another food provided herein. The rheology profile exhibits a $RIM_{21}$ that is at least $1 \times 10^1$ Pa greater than the $RIM_{37}$. The food has a pleasant texture reminiscent of a stabilized nut butter spread.
Figure 4:
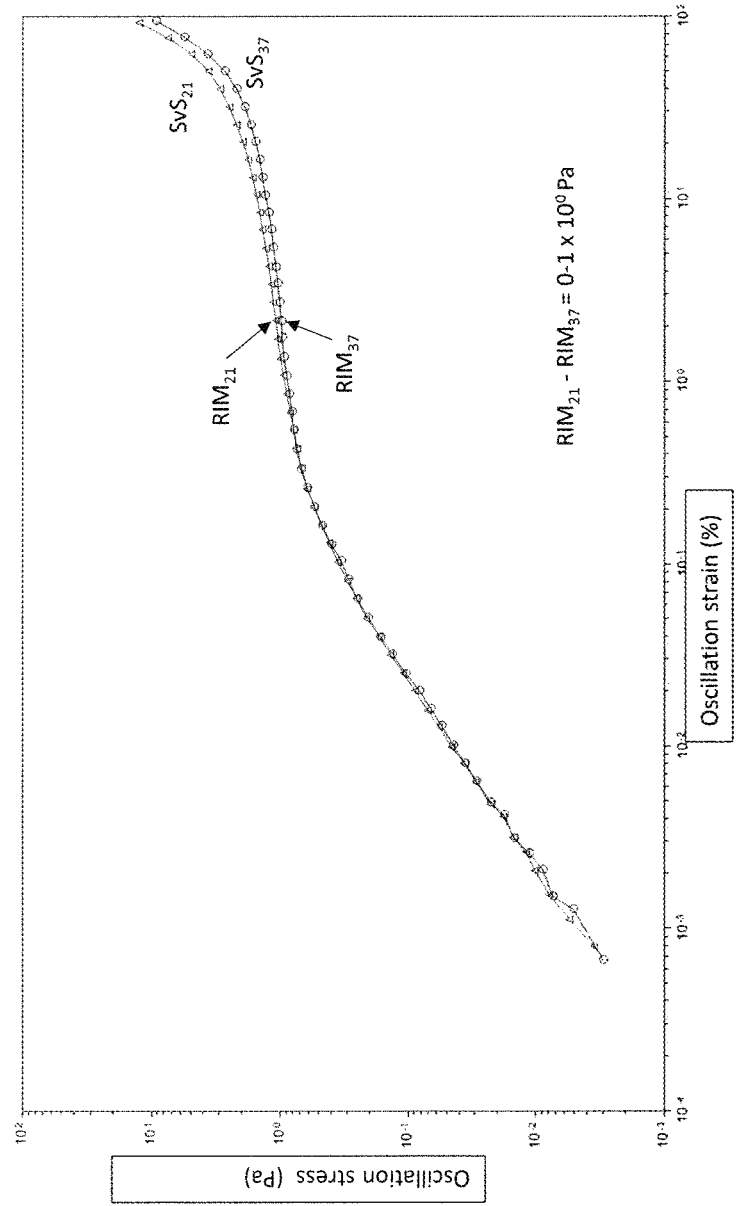
FIG. 4 shows a rheology profile of an almond butter suitable as an ingredient in a food provided herein. The rheology profile exhibits a $RIM_2$, that is less than $1 \times 10^1$ Pa greater than the $RIM_{37}$. The food has a pleasant texture reminiscent of a natural nut butter spread.
Figure 5:
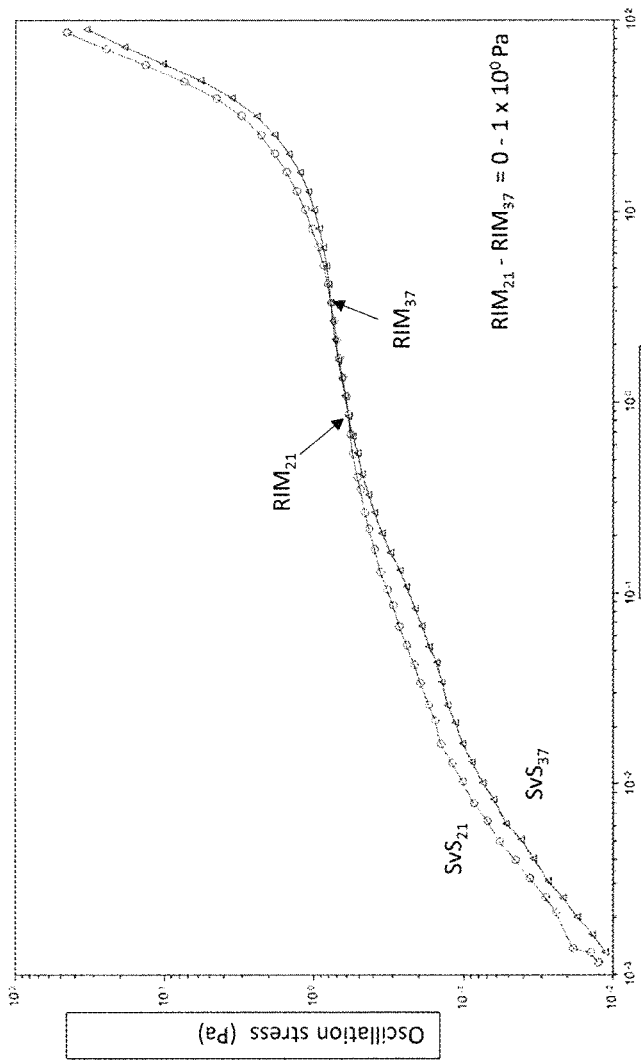
FIG. 5 shows a rheology profile of a comparative commercially available nut butter spread. The rheology profile exhibits a $RIM_2$, that is less than $1 \times 10^1$ Pa greater than the $RIM_{37}$. The food has a texture reminiscent of a natural nut butter spread.
Figure 6:
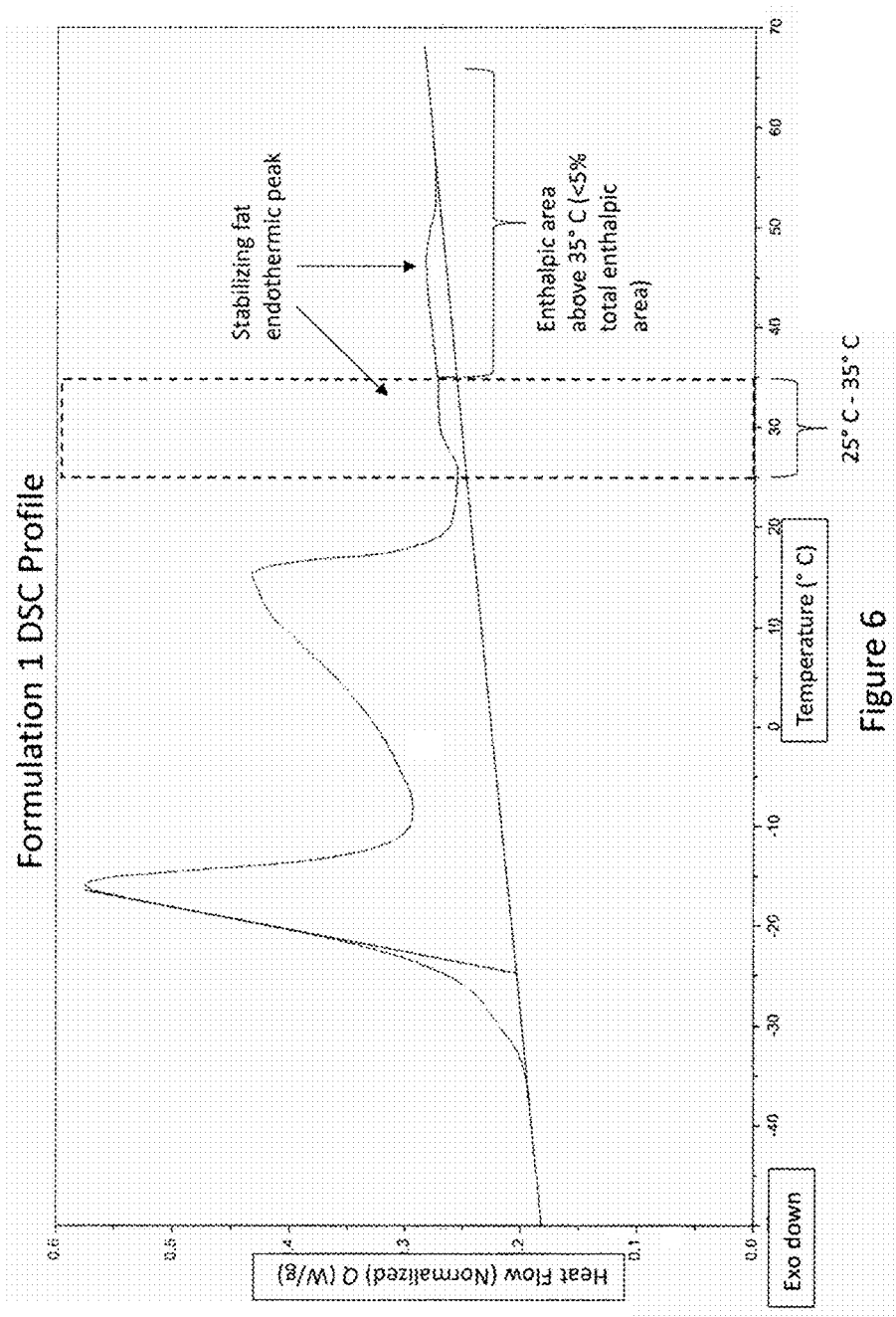
FIG. 6 shows a DSC profile of a food provided herein. The DSC profile exhibits a stabilizing fat endothermic peak, and an enthalpic area above 35° C. that is less than 10% of the total enthalpic area under the DSC curve. The food has good stability during shelf life at room temperature, with minor oil separation and a pleasant texture reminiscent of a natural nut butter spread.
Figure 7:
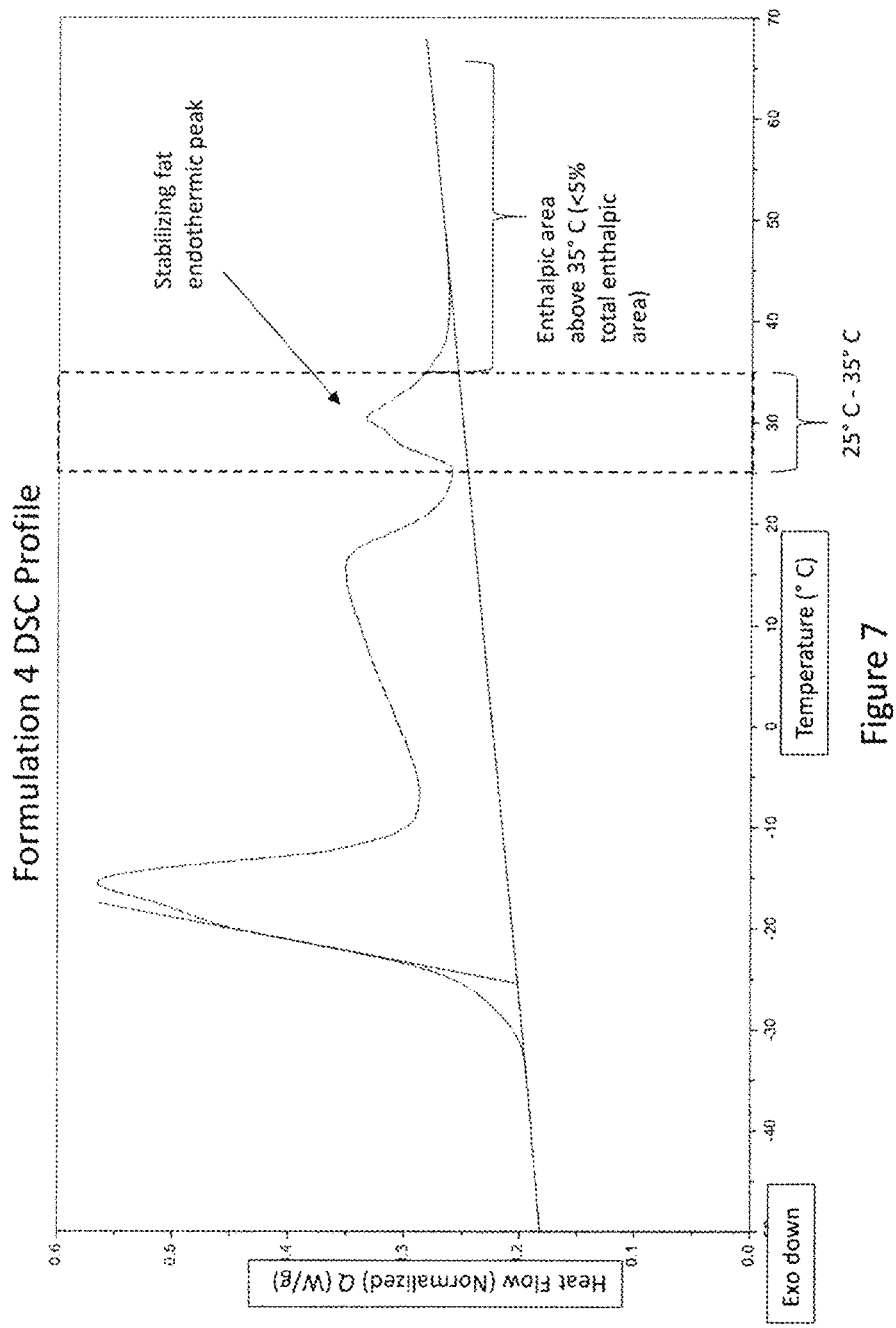
FIG. 7 shows a DSC profile of another food provided herein. The DSC profile exhibits a stabilizing fat endothermic peak, and an enthalpic area above 35° C. that is less than 10% of the total enthalpic area under the DSC curve. The food has good stability during shelf life at room temperature, with little to no oil separation and a pleasant texture reminiscent of a stabilized nut butter spread.
Figure 8:
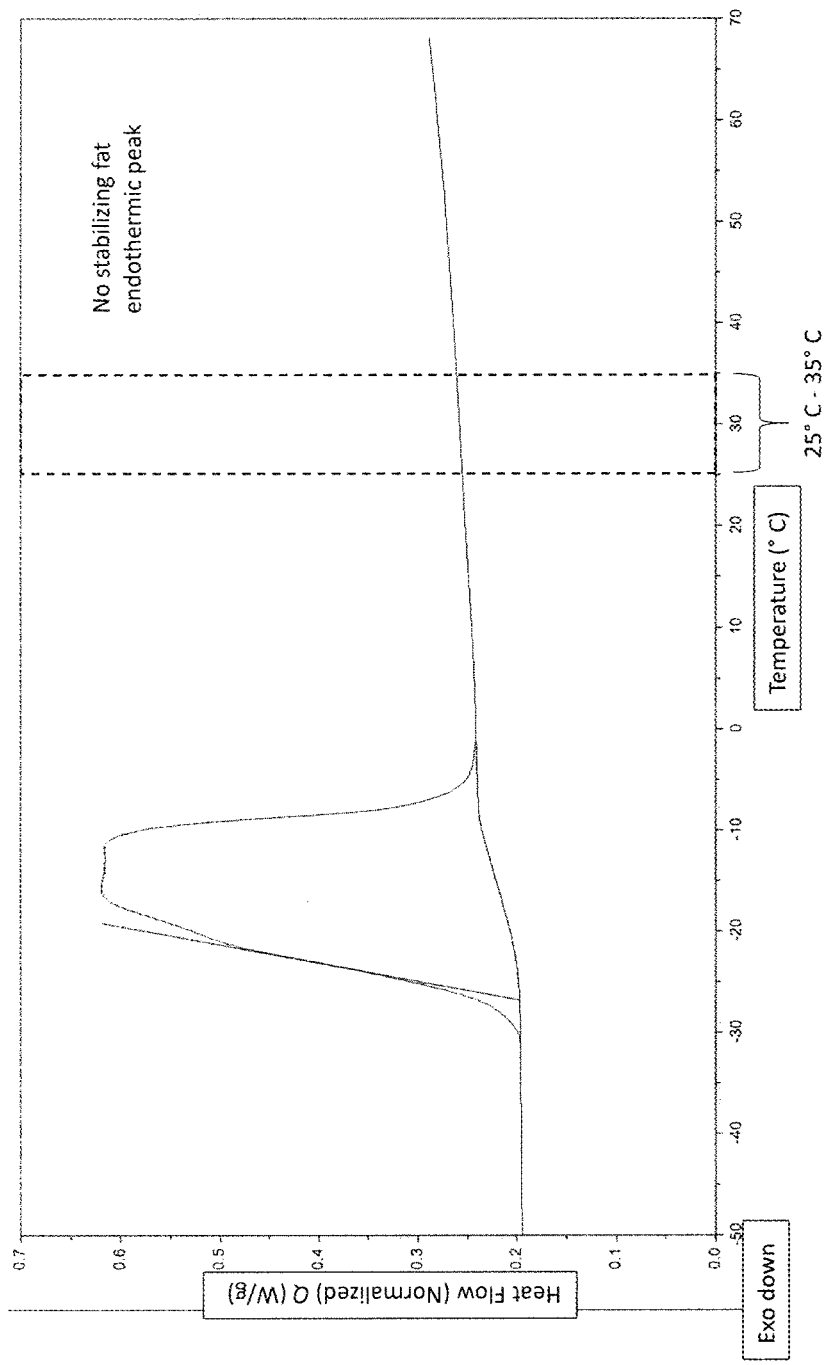
FIG. 8 shows a DSC profile of an almond butter suitable as an ingredient in a food provided herein. The DSC profile exhibits no stabilizing fat endothermic peak. The almond butter has moderate oil separation over shelf life, and a pleasant texture reminiscent of a natural nut butter spread.
Figure 9:
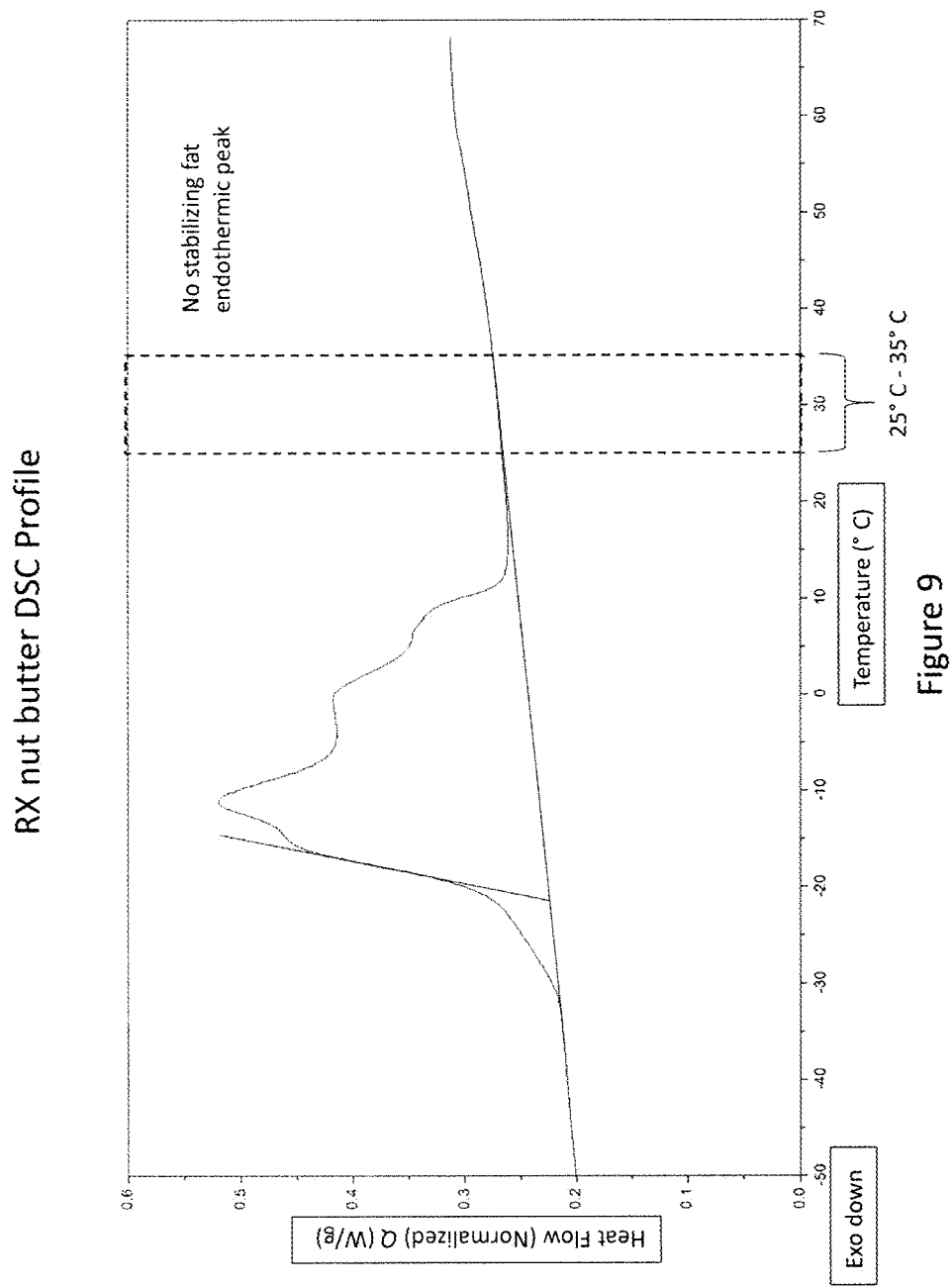
FIG. 9 shows a DSC profile of a comparative commercially available nut butter spread. The DSC profile exhibits no stabilizing fat endothermic peak. The nut butter spread exhibits severe oil separation over shelf life, and has a texture reminiscent of a natural nut butter spread.

A "nut butter," as used herein refers to a composition made from nuts (e.g., peanuts, cashews, almonds, pistachios, walnuts, and the like) ground to a paste, typically after roasting, and including the natural oils and solids from the nuts, and optionally salt, but essentially no other ingredients. Nut butters without any added ingredients are available to consumers, but are often combined with sugar or other sweeteners and sold as "natural" nut butter spreads. Nut butters without any additional ingredients, as well as those combined with sweeteners to produce spreads, but containing no additional fats, often exhibit separation of nut oil from nut solids during shelf life. Natural nut butter spreads are often stirred before consumption to incorporate the oils and ensure that the texture upon eating is creamy.

A nut butter can be combined with a hard fat (e.g., palm stearin, fully hydrogenated soybean oil, or other hard fat), and sometimes additional ingredients (e.g., emulsifiers), to make a stabilized nut butter spread, such as products sold under the brand names Jif® and Skippy®, to reduce or prevent oil separation during shelf life. Stabilized nut butter spreads tend to be more solid at room temperature than natural nut butter spreads, but become softer in the mouth and exhibit a creamy texture when worked with the tongue.

Although nut butters and natural nut butter spreads can contain up to about 25% by weight protein, they are prone to problems, such as oil separation, during shipping, handling, or shelf life. Stabilized nut butter spreads generally have a protein content of less than 25% by weight, but simply adding protein ingredients to stabilized nut butter spread results in poor eating qualities, including a drying effect in the mouth (astringency), and a lack of a creamy texture associated with nut butters.

It was discovered, and is disclosed herein, that a food can be produced that includes at least 50% nut butter by weight, a protein content of at least 25% (e.g., from 25% to about 35%, from about 26% to about 32%, or from about 27% to about 30%) by weight of the food, and has a shelf stability of at least 60 days without significant oil separation, yet avoids significant astringency and retains a creamy texture resembling a stabilized or natural nut butter spread. A food provided herein has a consistency that is convenient for eating directly or spreading on a food article (e.g., fruit, bread, crackers, cookies, and the like) for consumption without requiring significant force or causing significant damage to the food article.

Ingredients

A food provided herein includes a nut butter in an amount of at least 50% (e.g., 50% to about 65%, about 52% to about 60%, or about 55% to about 58%). Any appropriate nut butter can be used, such as peanut butter, cashew butter, almond butter, pistachio butter, walnut butter, and the like, or any combination thereof. Coconut butter is generally not preferred for a food provided herein. A nut butter content of at least 50% can help impart a good nut butter flavor to a food described herein and ensures that nut butter contributes the highest content by weight of ingredients included in the food.

A food provided herein also includes a powdered protein ingredient in an amount sufficient to provide at least 12% (e.g., from about 13% to about 18%, or from about 14% to about 15%) protein by weight of the food. As used herein, a powdered protein ingredient refers to one or more protein concentrate powder or a protein isolate powder having a protein content of at least 70% (e.g., at least 85%, at least 90%, or at least 95%) by weight of the powdered protein ingredient. Suitable powdered protein ingredients include, for example, dairy protein concentrates and/or isolates (e.g., milk protein, whey, casein, and the like), egg protein ingredients (e.g., egg white), legume protein concentrates and/or isolates (e.g., soybean, lentil, pea, and the like), grain protein concentrates and/or isolates (e.g., wheat, barley, oat, and the like), seed protein concentrates and/or isolates (e.g., sunflower seed, quinoa, and the like), bacterial protein concentrates and/or isolates, algal protein concentrates and/or isolates, or any combination thereof.

In some embodiments, a combination of powdered protein ingredients can contribute to a preferred texture and/or flavor relative to any one powdered protein ingredient alone. For example, whey can sometimes contribute to a stiffer texture due to agglomeration of the whey protein, while soy can sometimes contribute to an off flavor, but a combination of whey and soy proteins at a ratio of about 70:30 about 30:70 (e.g., about 60:40 to about 40:60, about 55:45 to about 45:55, or about 50:50) can provide a good balance between a preferred texture and a preferred flavor. In another example, egg white, similar to whey protein, can sometimes agglomerate to cause stiffness or hardness of a food product, and combining egg white with a different protein can help to reduce stiffness of the product. In some cases, blending proteins to reduce agglomeration can also contribute to reduced risk of oil separation in a food provided herein.

Preferably, a powdered protein ingredient has particles, where at least 80% (e.g., at least 85%, at least 90%, at least 95%, or at least 98%) of the particles pass through a No. 325 mesh. In some embodiments, at least 80% (e.g., at least 85%, at least 90%, at least 95%, or at least 98%) of the particles in a powdered protein ingredient pass through a No. 400 mesh. A powdered protein ingredient having particles where at least 80% of the particles pass through a No. 325 mesh can provide a smoother texture in a food product provided herein in embodiments where little to no water is available in the food (e.g., less than 2.5%, less than 2%, or less than 1% moisture content in the food) to solubilize the powdered protein ingredient.

A food provided herein includes a stabilizing fat in an amount of from about 14% to about 22% (e.g., about 15% to about 18%) by weight of the food. A suitable stabilizing fat can have a Mettler Dropping Point (MDP) of from about 32° C. to about 48° C. (e.g., from about 34° C. to about 46° C., or about 34° C. to about 40° C.). A stabilizing fat can have a 10° C. to 40° C. solid fat content ($SFC_{10-40}$) profile having a formula of y=mx+b, where y is solid fat content, x is temperature in Celsius m is a slope having a value between about −1.5 and about −3.5 (e.g., about −1.5 to about −3), and b is a y-intercept having a value between about 60° C. and about 120° C. (e.g., about 60° C. to about 100° C.).

As used herein, a $SFC_{10-40}$ profile for a fat is determined by plotting solid fat content (SFC) values as a function of temperature, where the SFC values are measured at 10° C., 21.1° C., 26.7° C., 33.3° C., and 40° C., and fitting a line to the SFC values using least squares linear regression. The fitted line is the $SFC_{10-40}$ profile for the fat. SFC is measured by nuclear magnetic resonance (NMR) according to AOCS Cd 16b-93 (Firestone, D. (Ed.). (2009). *Official Methods and Recommended Practices of the AOCS* (6$^{th}$ ed.). AOCS Press). A stabilizing fat having a described $SFC_{10-40}$ profile can contribute to a mouthfeel that melts pleasantly in the mouth without creating an unpleasant waxiness.

In some embodiments, a stabilizing fat can have a 26.7° C. to 40° C. solid fat content ($SFC_{27-40}$) profile having a formula of y=mx+b, where y is solid fat content, x is temperature in Celsius m is a slope having a value between about −0.01 and about −2 (e.g., about −0.01 to about −1.5), and b is a y-intercept having a value between about 5° C. and about 60° C. (e.g., about 5° C. to about 30° C.).

As used herein, a $SFC_{27-40}$ profile for a fat is determined by plotting solid fat content (SFC) values as a function of temperature, where the SFC values are measured at 26.7° C., 33.3° C., and 40° C., and fitting a line to the SFC values using least squares linear regression. The fitted line is the $SFC_{27-40}$ profile for the fat. A stabilizing fat having a described $SFC_{27-40}$ profile can contribute to a preferred mouthfeel by ensuring sufficient fat solids are present to reduce perceived astringency and/or particle size of a powdered protein ingredient and/or a powdered food ingredient.

In some embodiments, a stabilizing fat can have a 10° C. to 26.7° C. solid fat content ($SFC_{10-27}$) profile having a formula of y=mx+b, where y is solid fat content, x is temperature in Celsius m is a slope having a value between about −2.5 and about −6 (e.g., about −3 to about −5), and b is a y-intercept having a value between about 80° C. and about 135° C. (e.g., about 105° C. to about 130° C.).

As used herein, a $SFC_{10-27}$ profile for a fat is determined by plotting solid fat content (SFC) values as a function of temperature, where the SFC values are measured at 10° C., 21.1° C., and 26.7° C., and fitting a line to the SFC values using least squares linear regression. The fitted line is the $SFC_{10\text{-}27}$ profile for the fat. A stabilizing fat having a described $SFC_{10\text{-}27}$ profile can contribute to a preferred mouthfeel by contributing to a rapid softening of a food in the mouth.

A stabilizing fat suitable for use in a food provided herein can include any appropriate fat, oil, or combinations of fats and/or oils. In some embodiments, a stabilizing fat can include a palm oil, a palm oil fraction, a palm kernel oil, a palm kernel fraction, a coconut oil, a coconut oil fraction, or any combination thereof. For example, in some embodiments, a stabilizing fat can include a coconut oil and a palm oil stearin. In some embodiments, a stabilizing fat can include one or more fat and/or oil that is interesterified. For example, in some embodiments, a stabilizing fat can include a palm oil, a palm kernel oil or a coconut oil, a palm kernel stearin, and a palm oil stearin, where one or more of the palm oil, the palm kernel oil or coconut oil, the palm kernel stearin, and the palm oil stearin is interesterified.

In some embodiments, a stabilizing fat provided herein can contribute lauric acid in an amount of about 3% to about 10% (e.g., about 4% to about 8%) by weight of the food. Lauric acid can contribute to a desirable mouthfeel of a food provided herein.

A food provided herein includes a powdered food ingredient in an amount of from about 8% to about 25% (e.g., about 10% to about 20%, or about 10% to about 18%) by weight of the food. As used herein, a powdered food ingredient refers to one or more powdered edible ingredient having a protein content of less than 70% by weight of the powdered food ingredient. A powdered food ingredient can be any appropriate food ingredient, such as a sweetener (e.g., a sugar, a sugar alcohol, a high intensity sweetener, allulose, and the like, or any combination thereof), a flour (e.g., a grain flour, a defatted nut flour, a root flour, and the like, or any combination thereof), a starch (e.g., corn starch, potato starch, and the like, or any combination thereof), a flavorant (e.g., cinnamon, cocoa powder, nutmeg, powdered pepper, and the like, or any combination thereof), salts (e.g., table salt, sea salt, and the like), or any combination thereof.

In some embodiments, a powdered food ingredient can contribute to a desired sweetness of a food provided herein. For example, a powdered food ingredient can include a sugar, a sugar alcohol, or allulose in an amount of from about 6% to about 20% by weight of a food. In some embodiments, a powdered food ingredient can contribute to a desired flavor of a food provided herein. For example, a defatted nut flour can contribute to a nut flavor in a food provided herein. In some embodiments, a powdered food ingredient can contribute to texture of a food provided herein by providing bulk to the food ingredient.

In some embodiments, a food provided herein can include no added sugar. For example, a food provided herein can include one or more non-caloric sweetener, such as erythritol or allulose in an amount of from about 6% to about 20% by weight of the food. It is particularly surprising that, in some embodiments of a food provided herein containing erythritol, the cooling effect of erythritol can be muted or nearly imperceptible. Without being bound by theory, it is believed that a stabilizing fat contributing lauric acid in an amount of about 3% to about 10% (e.g., about 4% to about 8%) by weight of the food can mask the cooling effect of erythritol.

Preferably, a powdered food ingredient has particles, where at least 80% (e.g., at least 85%, at least 90%, at least 95%, or at least 98%) of the particles pass through a No. 325 mesh. In some embodiments, at least 80% (e.g., at least 85%, at least 90%, at least 95%, or at least 98%) of the particles in a powdered food ingredient pass through a No. 400 mesh. A powdered food ingredient having particles where at least 80% of the particles pass through a No. 325 mesh can provide a smoother texture in a food product provided herein in embodiments where little to no water is available in the food (e.g., less than 2.5%, less than 2%, or less than 1% moisture content in the food) to solubilize the powdered food ingredient.

Additional ingredients can be included in a food provided herein. For example, emulsifiers (e.g., lecithin, or the like), flavorants (e.g., vanilla extract, peanut oil extract, almond extract, or the like), colorants (e.g., extracts, fruit and/or vegetable juices, dyes, and the like), and the like, or any combination thereof, can be included in a food article provided herein. Additional ingredients can be included in a total amount of less than 8% (e.g., less than 5%, or less than 2%).

In some embodiments, a food provided herein can have a moisture content of less than 2.5% (e.g., less than 2%, or less than 1%) by weight.

Stability and Texture

A food provided herein has a shelf stability of at least 60 days (e.g., 90 days, or at least 180 days) with little to no oil separation. See, FIG. 1. In some embodiments, a food provided herein can exhibit minor oil separation (see, FIG. 1), however, the oil can be readily reincorporated by stirring without significant effort.

In some embodiments, a food provided herein can have a rheology profile predictive of a texture resembling a stabilized nut butter spread. As described above, a stabilized nut butter spread tend to be more solid at room temperature than natural nut butter spreads, but becomes softer in the mouth and exhibits a creamy texture when worked with the tongue. As used herein, a rheology predictive of a texture resembling a stabilized nut butter spread includes a rheology inflection midpoint at 21° C. ($RIM_{21}$) and a rheology inflection midpoint at 37° C. ($RIM_{37}$), where the $RIM_{21}$ is at least $1\times10^1$ (e.g., at least $1\times10^2$, or from $1\times10^2$ to $1\times10^4$) Pascals (Pa) greater than the $RIM_{37}$. Without being bound by theory, it is believed that a food with a $RIM_{21}$ at least $1\times10^1$ Pa greater than a $RIM_{37}$ predicts a texture resembling a stabilized nut butter spread by reflecting a shear resistance of a food that is greater upon first being place in the mouth (e.g., at room temperature) as compared to shear resistance once the food has warmed in the mouth, which could be perceived as becoming creamier as it is worked with the tongue.

In some embodiments, a food provided herein can have a rheology profile predictive of a texture resembling a natural nut butter spread, which can have a $RIM_{21}$ that is less than $1\times10^1$ Pa greater than the $RIM_{37}$.

As used herein, a rheology profile is determined using an ARG2 Rheometer (TA Instruments) equipped with a Peltier thermal control system using upper brushed and lower crosshatched 40 mm parallel plates. Briefly, a sample to be profiled is mixed to ensure homogeneity before testing, then subjected to an initial conditioning step at 21° C. for 15 minutes. Following the initial conditioning step, an oscillatory amplitude ramp is done with a frequency of 1 Hz and a ramp strain of from 0.001% to 100% as a second conditioning step. Following the second conditioning step, the sample is equilibrated to 37° C. for 15 minutes and subjected to an oscillatory amplitude ramp is done with a frequency of 1 Hz and a ramp strain of from 0.001% to 100% as a first measuring step, and a stress versus strain ($SvS_{37}$) curve is plotted from the data generated. Following the first measuring step, the sample is equilibrated to 21° C. for 15 minutes and subjected to an oscillatory amplitude ramp is done with a frequency of 1 Hz and a ramp strain of from 0.001% to 100% as a second measuring step, and a stress versus strain ($SvS_{21}$) curve is plotted from the data generated. $RIM_{21}$ and $RIM_{37}$ are determined from the $SvS_{21}$ and $SvS_{37}$ curves, respectively, using the following method. A first derivative (wrt X) curve is generated from the appropriate SvS curve. The point closest to or at zero on the first derivative curve is identified. The stress value on the SvS curve coinciding with the point at or closest to zero on the first derivative curve is determined to be the rheology inflection midpoint for the SvS. See, FIG. 2, FIG. 3, FIG. 4, and FIG. 5.

In some embodiments, a food provided herein can have a differential scanning calorimetry (DSC) profile predictive of resistance to oil separation. As used herein, a DSC profile predictive of resistance to oil separation includes a stabilizing fat endothermic peak. As used herein, a "stabilizing fat endothermic peak" refers to a DSC endothermic peak occurring at or above 25° C. See, FIG. 6, FIG. 7, FIG. 8, and FIG. 9. Without being bound by theory, it is believed that a stabilizing fat endothermic peak is indicative of the presence of some solid fat content at or above room temperature, which can contribute to inhibition of protein agglomeration during shelf life.

In some embodiments, a food provided herein can have a stabilizing fat endothermic peak that is between 25° C. and 35° C., which can be predictive of a texture that melts in the mouth and/or lacks a waxy texture. In some embodiments, a DSC profile can have an enthalpic area above 35° C. that is less than 10% (e.g., 5% or less) of the total enthalpic area of the DSC profile, which can be predictive of a texture that lacks a waxy texture. In addition, a DSC profile with an area above 35° C. that is less than 10% of the total enthalpic area of the DSC profile may be predictive of fewer overall solids at body temperature, especially combined fat solids and protein solids, leaving a cleaner mouthfeel than a DSC profile with an area above 35° C. that is greater than 10% of the total enthalpic area of the DSC profile.

As used herein, a DSC profile is determined using a DSC2500 (TA Instruments; New Castle, Del., USA). Briefly, a sample to be profiled is mixed to ensure homogeneity and placed at room temperature in a non-hermetic pan with about 10 g of sample in the pan. The sample is then tested using the following protocol:
1. Ramp 10° C./minute to −65° C.
2. Isothermal 1.0 minute
3. Ramp 10° C./minute to 70° C.
4. Isothermal 1.0 minute
5. Ramp 10° C./minute to −65° C.
6. Isothermal 1.0 minute
7. Ramp 10° C./minute to 80° C.

DSC profile is recorded at step 3 of the protocol and graphed as shown in FIG. 6, FIG. 7, FIG. 8, and FIG. 9. Total enthalpic area of a DSC profile is the area under the DSC curve (normalized using computer software) and measured during step 3 from −50° C. to 70° C. Enthalpic area above 35° C. is the area of a DSC profile under the DSC curve (normalized using computer software) and measured during step 3 from 35° C. to 70° C. One or more endothermic peaks can be apparent on a DSC profile, but for the purposes of this application, only those at or above 25° C. are considered stabilizing fat endothermic peaks. It is to be understood that a stabilizing fat may contribute to one or more endothermic peak below 25° C. even though they are not referred to as stabilizing fat endothermic peaks.

Methods of Making and Use

A food provided herein can be packaged in any suitable packaging. For example, a food provided herein can be packaged in a glass or plastic jar suitable for allowing a consumer to remove only a portion of the food at a time. In another example, a food provided herein can be packaged in a foil or plastic packet containing a single serving of the food.

Also provided herein are methods of making a food provided herein. Any appropriate method and equipment can be used to make a food provided herein. Ingredients used to make a food provided herein can be combined in any suitable order to produce the food. In some embodiments, methods and conditions of making a food provided herein can be designed to render the food, or ingredients or combinations of ingredients used to make the food, suitable for use in a food manufacturing setting. For example, a method of making a food provided herein can be designed to ensure that the food, ingredients used to make the food, or combinations of ingredients used to make the food are pumpable using standard food manufacturing equipment.

In some embodiments, a stabilizing fat can heated to a temperature sufficient to ensure melting of the stabilizing fat and combined with a nut butter using equipment and sufficient shear to achieve complete mixing of the nut butter and stabilizing fat before adding the remaining ingredients. For example, a stabilizing fat can be heated to a temperature at or above the melting point of the stabilizing fat before or after combination of the stabilizing fat with a nut butter and mixed to homogeneity to make a fat and nut butter mixture. A fat and nut butter mixture can then be combined with a powdered protein ingredient and a powdered food ingredient to make a food provided herein.

In some embodiments, shear used during making, pumping, or storing a food provided herein can be sufficient to ensure mixing, but low enough to prevent significant agglomeration of powdered protein ingredients. In some embodiments, temperature used during making, pumping, or storing a food ingredient can be selected to ensure mixing of ingredients and/or pumpability of the food and/or ingredients to make the food, but low enough to prevent heat damage to ingredients in the food.

In one embodiment of a method of making a food, a nut butter is mixed in a heated mixer and stabilizing fat is added and mixed at a temperature of from about 60° C. to about 70° C. (e.g., about 60° C. to about 65° C., or about 60° C.) for sufficient time to ensure complete melting of the stabilizing fat and complete mixing of the fat and nut butter to make a fat and nut butter mixture. The fat and nut butter mixture is combined with powdered protein ingredient, powdered food ingredient, and any additional ingredients at a temperature of from about 60° C. to about 70° C. (e.g., about 60° C. to about 65° C., or about 60° C.) for sufficient time to produce a food described herein. The food can be optionally temperature adjusted to achieve a temperature suitable for packaging (e.g., about 40° C. to about 65° C., or about 45° C. to about 60° C.). The food can be optionally stored at a temperature above 38° C. (e.g., about 40° C. to about 60° C., or about 45° C. to about 60° C.) before packaging. In some embodiments, a food can be stored at a temperature above 38° C. for limited time (e.g., less than 6 hours, less than 5 hours, or less than 4 hours) to prevent development of flavor off-notes and/or prevent protein agglomeration.

The following examples are provided to show selected embodiments of the invention described herein. The examples are not intended to limit the invention to any particular embodiment.

EXAMPLES

Example 1

Several formulations of a nut butter-based food were produced. Formulations are described in Table 1. Total protein content in Formulations 1-6 was derived from soy protein isolate, whey protein isolate, and the identified nut butter (i.e., almond butter or peanut butter) as indicated in Table 1. SPI refers to soy protein isolate in Table 1. WPI refers to whey protein isolate in Table 1.

TABLE 1

| Ingredient | Formulation | | | | | |
|---|---|---|---|---|---|---|
| | 1 % weight | 2 % weight | 3 % weight | 4 % weight | 5 % weight | 6 % weight |
| Almond butter | 50-60 | 50-60 | 0 | 50-60 | 50-60 | 0 |
| Peanut butter | 0 | 0 | 50-60 | 0 | 0 | 50-60 |
| SPI | 5-10 | 5-10 | 5-10 | 5-10 | 5-10 | 5-10 |
| WPI | 5-10 | 5-10 | 5-10 | 5-10 | 5-10 | 5-10 |
| Fat A | 15-20 | 0 | 0 | 0 | 0 | 0 |
| Fat B | 0 | 15-20 | 0 | 0 | 0 | 15-20 |
| Fat C | 0 | 0 | 15-20 | 0 | 0 | 0 |
| Fat D | 0 | 0 | 0 | 15-20 | 0 | 0 |
| Fat E | 0 | 0 | 0 | 0 | 15-20 | 0 |
| Erythritol | 6-12 | 6-12 | 6-12 | 6-12 | 6-12 | 6-12 |
| Other | 0-2 | 0-2 | 0-2 | 0-2 | 0-2 | 1-4 |

TABLE 2 describes each of the fats from Table 1.

| | Fat A | Fat B | Fat C | Fat D | Fat E |
|---|---|---|---|---|---|
| MDP | 33-36° C. | 35-37° C. | 38-40° C. | 35-37° C. | 45-47° C. |
| $SFC_{10-40}$ slope | −1.5 to −2 | −3 to −3.5 | −2.5 to −3 | −2.5 to −3 | |
| $SFC_{10-40}$ y-intercept | 65-75° C. | 125-135° C. | 100-110° C. | 90-100° C. | |
| $SFC_{10-27}$ slope | −4.2 to −4.7 | −1.5 to −2 | −2.5 to −3 | −4 to −4.5 | |
| $SFC_{10-27}$ y-intercept | 120-130° C. | 100-110° C. | 100-110° C. | 120-130° C. | |
| $SFC_{27-40}$ slope | −0.01 to −0.2 | −4 to −4.5 | −1 to −2 | −0.5 to −1 | |
| $SFC_{27-40}$ y-intercept | 5-10° C. | 155-165° C. | 70-80° C. | 20-30° C. | |
| Lauric acid content (% by weight) | 43-47 | 53-56 | 34-38 | 32-36 | 7-10 |

Formula 1 had a soft, spreadable texture. Over shelf life, Formula 1 exhibited light oil separation over shelf life that could be readily mixed into the product. The mouthfeel of Formula 1 was very creamy when consumed with a limited amount of cooling effect from erythritol. Formulations 2, 3, and 6 exhibited a firm texture prior to eating, with very little oil separation over shelf life. Formulations 2, 3 and 6 had a creamy texture, with a noticeable cooling effect from erythritol. The amount of nut flavor from Formulation 2 was stronger than Formulations 3 and 6. Formulation 4 had a soft, spreadable texture with even less oil separation than Formulation 1. The texture of Formulation 4 upon eating was soft and malleable, but slightly waxier and less intense almond flavor than Formulation 1. Formulation 4 had low erythritol cooling sensation, similar to Formulation 1. None of the formulations exhibited significant oil separation over at least a 90 day shelf life at room temperature.

Example 2

Formulations 1 and 4 from Table 1 were subjected to rheological testing as described above, and compared to a commercially available high protein nut butter spread (RX Nut Butter™ peanut butter in packet packaging; Kellogg's, Battle Creek, Mich., USA), and a commercially available natural almond butter used as an ingredient in Formulations 1 and 4. It was observed that the commercially available high protein nut butter spread exhibited high levels of oil separation, and needed to be kneaded in the packet to encourage reincorporation of the oil into the other ingredients in the packet. As a result, the commercially available nut butter spread was first kneaded to combine the ingredients, while Formulation 1 and Formulation 4 from Table 1, and the almond butter ingredient, were simply stirred before allowing the samples to rest prior to rheology measurements. A jarred almond butter version of the commercially available high protein nut butter was also observed to exhibit high levels of oil separation. See, FIG. 1, comparing oil separation in Formulation 1, Formulation 4, and the RX almond butter. The jarred version was extremely difficult to reincorporate the oil due to solids being packed at the bottom of the jar that withstood stirring with a plastic spoon. Without being bound by theory, it is believed that the oil separation in the commercially available high protein nut butter spread may have been due, in part, to a lack of stabilizing fat and exacerbated by agglomeration of egg white protein used to increase protein content in the product.

Each of the $RIM_2$, and $RIM_{37}$ values were determined for Formulation 1, Formulation 4, and the commercially available high protein nut butter spread, as well as an almond butter suitable for use as an ingredient in a food provided herein. $RIM_2$, was at least $1 \times 10^1$ Pa greater than $RIM_{37}$ for Formulation 4, with $RIM_{21}$-$RIM_{37}$ being $3$-$4 \times 10^2$ Pa. This was consistent with an eating experience that was reminiscent of a stabilized nut butter spread, where the food becomes less resistant to shear applied by the tongue as the food warms in the mouth. The $RIM_{21}$-$RIM_{37}$ for Formulation 1, the commercially available high protein nut butter spread, and the almond butter was less than $1 \times 10^0$ Pa, which is consistent with an eating experience reminiscent of a natural nut butter spread, which has a similar resistance to shear applied by the tongue immediately after being placed in the mouth as when it warms to body temperature.

Example 3

Formulations from Table 1 were subjected to DSC testing to observe melting characteristics contributing to shelf stability as a filling, as well as a desirable eating experience. DSC profiles were obtained according to the method described above. The DSC profiles of Formulations from Table 1 were compared to the DSC profile of the commercially available high protein nut butter spread described in Example 2, as well as an almond butter suitable as an ingredient for a food provided herein.

Upon eating, the commercially available product (RX nut butter) had a consistency similar to a natural nut butter spread, but with moderate astringency and solids that contributed to a toothpack texture. The astringency and tooth pack texture are believed to be due to the added protein, listed as egg white, in the product. There was very little difference in texture from when the commercially available product was first put into the mouth and after it had warmed in the mouth, suggesting that little to no melting was occurring in the mouth. This was consistent with the DSC profile of the commercial product, which showed no stabilizing fat endothermic peak above room temperature, suggesting that the fat content in the product is liquid at room temperature. See, FIG. 9.

Upon eating, the almond butter had a consistency similar to a natural nut butter spread. The almond butter was less astringent and less prone to tooth pack than the commercially available product (RX nut butter). Similar to the commercially available product, there was very little difference in texture from when the commercially available product was first put into the mouth and after it had warmed in the mouth, suggesting that little to no melting was occurring in the mouth. This was consistent with the DSC profile of the commercial product, which showed no stabilizing fat endothermic peak above room temperature, suggesting that the fat content in the product is liquid at room temperature. See, FIG. 8.

In contrast to the commercially available nut butter spread, Formulations 1 and 4 exhibited at least one stabilizing fat endothermic peak (endothermic peak at or above 25° C.). Each of Formulations 1 and 4 exhibit minor to no oil separation during shelf life. See, Example 2. It is believed that having a stabilizing fat endothermic peak at or above 25° C. is predictive of stability against oil separation with higher peaks being predictive of more stability. However, stabilizing fat endothermic peaks exceeding 45° C. can be predictive of a texture that is more likely to be waxy due to higher solids content at higher temperatures, with higher peaks being more predictive of a greater degree of waxiness.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A spreadable food, comprising:
   a. nut butter in an amount of at least 50% by weight of the food;
   b. at least 25% protein by weight of the food, the protein including a powdered protein ingredient contributing at least 12% protein by weight of the food, the powdered protein ingredient having a protein content of at least 70% by weight of the powdered protein ingredient;
   c. a stabilizing fat in an amount of about 14% to about 22% by weight of the food, the stabilizing fat contributing lauric acid in an amount of about 3% to about 10% by weight of the food, the stabilizing fat having a Mettler Dropping Point of from about 32° C. to about 48° C., the stabilizing fat having a 26.7° C. to 40° C. solid fat content ($SFC_{27\text{-}40}$) profile having a formula of y=mx+b, where
      y is solid fat content,
      x is temperature in Celsius,
      m is slope having a value between about −0.01 and about −2, and
      b is a y-intercept having a value between about 5° C. and about 60° C., and the stabilizing fat having a 10° C. to 40° C. solid fat content ($SFC_{10\text{-}40}$) profile, the $SFC_{10\text{-}40}$ profile having a formula of y=mx+b, where
      y is solid fat content,
      x is temperature in Celsius,
      m is slope having a value between about −1.5 and about −3.5, and
      b is a y-intercept having a value between about 60° C. and about 120° C.;
   d. a powdered food ingredient in an amount of about 8% to about 25% by weight of the food, the powdered food ingredient having a protein content of less than 70% by weight of the powdered food ingredient;
   e. a shelf stability of at least 60 days;
   f. a spreadable texture;
   g. a texture that exhibits a decrease in shear resistance at 37° C. relative to 21° C.; and
   h. a moisture content of less than 2.5% by weight of the food, wherein the moisture content does not solubilize the powdered protein ingredient and does not solubilize the powdered food ingredient.

2. The spreadable food of claim 1, wherein the powdered food ingredient comprises erythritol in an amount of about 5% to about 15% by weight of the food.

3. The spreadable food of claim 1, wherein the $SFC_{10\text{-}40}$ profile has the formula of y=mx+b, where
   y is solid fat content,
   x is temperature in Celsius,
   m is slope having a value between about −1.5 and about −3, and
   b is a y-intercept having a value between about 60° C. and about 100° C.

4. The spreadable food of claim 1, wherein the $SFC_{27\text{-}40}$ profile has the formula of y=mx+b, where
   y is solid fat content,
   x is temperature in Celsius,
   m is slope having a value between about −0.01 and about −1.5, and
   b is a y-intercept having a value between about 5° C. and about 30° C.

5. The spreadable food of claim 1, wherein the stabilizing fat has a 10° C. to 26.7° C. solid fat content ($SFC_{10\text{-}27}$) profile, the $SFC_{10\text{-}27}$ profile having a formula of y=mx+b, where
   y is solid fat content,
   x is temperature in Celsius,
   m is slope having a value between about −2.5 and about −6, and
   b is a y-intercept having a value between about 80° C. and about 135° C.

6. The spreadable food of claim 5, wherein the $SFC_{10\text{-}27}$ profile has the formula of y=mx+b, where y is solid fat content,
x is temperature in Celsius,
m is slope having a value between about −3 and about −5, and
b is a y-intercept having a value between about 105° C. and about 130° C.

7. The spreadable food of claim 1, wherein the food has a rheology inflection midpoint at 21° C. ($RIM_{21}$) and a rheology inflection midpoint at 37° C. ($RIM_{37}$), where the $RIM_{37}$ is at least $1\times10^1$ Pa greater than the $RIM_{21}$.

8. The spreadable food of claim 1, wherein the powdered protein ingredient comprises whey protein and soy protein, the whey protein and soy protein included at a ratio of from about 30:70 to about 70:30.

9. The spreadable food of claim 1, wherein the stabilizing fat comprises a coconut oil, a palm kernel oil, a palm kernel oil stearin, or a coconut oil stearin.

10. The spreadable food of claim 9, wherein the stabilizing fat comprises a palm stearin and a coconut oil.

11. The spreadable food of claim 1, wherein the food includes nut butter in an amount of from 50% to about 65% by weight of the spreadable food.

12. The spreadable food of claim 1, wherein the nut butter comprises peanut butter, almond butter, or cashew butter.

13. The food product of claim 1, wherein the food product is packaged.

14. A method of making a spreadable food, the method comprising:
   a. heating a stabilizing fat containing lauric acid to a temperature at or above the melting temperature of the stabilizing fat, wherein the stabilizing fat has a Mettler Dropping Point of from about 32° C. to about 48° C., the stabilizing fat having a 26.7° C. to 40° C. solid fat content ($SFC_{27-40}$) profile having a formula of y=mx+b, where
   y is solid fat content,
   x is temperature in Celsius,
   m is slope having a value between about −0.01 and about −2, and
   b is a y-intercept having a value between about 5° C. and about 60° C., and the stabilizing fat has a 10° C. to 40° C. solid fat content ($SFC_{10-40}$) profile, the $SFC_{10-40}$ profile having a formula of y=mx+b, where
   y is solid fat content,
   x is temperature in Celsius,
   m is slope having a value between about −1.5 and about −3.5, and
   b is a y-intercept having a value between about 60° C. and about 120° C.;
   b. combining the melted stabilizing fat with a nut butter using sufficient shear to achieve complete mixing of the stabilizing fat and the nut butter to form a fat and nut butter mixture;
   c. combining the fat and nut butter mixture with a powdered protein ingredient and a powdered food ingredient to produce the spreadable food, wherein the spreadable food comprises:
      1) the nut butter in an amount of at least 50% by weight of the food;
      2) at least 25% protein by weight of the food, the protein including the powdered protein ingredient contributing at least 12% protein by weight of the food, the powdered protein ingredient having a protein content of at least 70% by weight of the powdered protein ingredient;
      3) the stabilizing fat in an amount of about 14% to about 22% by weight of the food, the stabilizing fat contributing lauric acid in an amount of about 3% to about 10% by weight of the food;
      4) the powdered food ingredient in an amount of about 8% to about 25% by weight of the food, the powdered food ingredient having a protein content of less than 70% by weight of the powdered food ingredient;
      5) a shelf stability of at least 60 days;
      6) a spreadable texture;
      7) a texture that exhibits a decrease in shear resistance at 37° C. relative to 21° C.; and
      8) a moisture content of less than 2.5% by weight of the food, wherein the moisture content does not solubilize the powdered protein ingredient and does not solubilize the powdered food ingredient.

15. The method of claim 14, wherein the stabilizing fat is heated to a temperature of from about 60° C. to about 70° C.

16. The method of claim 14, wherein the fat and nut butter mixture is combined with the powdered protein ingredient and the powdered food ingredient at a temperature of about 60° C. to about 70° C.

17. A food product comprising the spreadable food of claim 1.

18. The food product of claim 17, wherein the food product is packaged.

* * * * *